W. H. DUNGAN & D. H. HORNER.
Lifting-Jacks.
No. 6,134. Reissued Nov. 17, 1874.
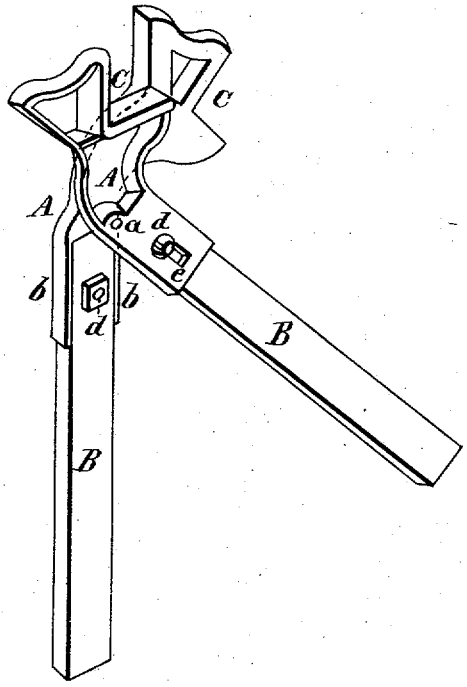
Witnesses.
Chas Thurman
G. L. Dyer
Inventors.
William H. Dungan.
Dan'l. H. Horner.
by Geo. W. Dyer & Co Attys
THE GRAPHIC CO. PHOTO-LITH. 39 & 41 PARK PLACE, N.Y.

UNITED STATES PATENT OFFICE.

WILLIAM H. DUNGAN AND DAVID H. HORNER, OF INDIANAPOLIS, INDIANA.

IMPROVEMENT IN LIFTING-JACKS.

Specification forming part of Letters Patent No. 147,916, dated February 24, 1874; reissue No. 6,134, dated November 17, 1874; application filed August 31, 1874.

*To all whom it may concern:*

Be it known that we, WILLIAM H. DUNGAN and DAVID H. HORNER, of Indianapolis, in the county of Marion and in the State of Indiana, have invented certain new and useful Improvements in Combined Wagon-Jack and Wrench; and do hereby declare that the following is a full, clear, and exact description thereof, reference being had to the accompanying drawings and to the letters of reference marked thereon, making a part of this specification.

The nature of our invention consists in the construction and arrangement of a wagon or lifting jack, which may be also used as a wrench, as will be hereafter more fully set forth.

In order to enable others skilled in the art to which our invention appertains to make and use the same, we will now proceed to describe its construction and operation, referring to the annexed drawing, which represents a side elevation of our wagon-jack.

Our wagon-jack is composed simply of two jaws or heads, A A, and two handles or legs, B B. The jaws or heads A A are made of cast-iron, exactly alike, and pivoted together at *a*. Below the pivot-joint they are provided with side flanges *b b*, and forming at the lower end of each jaw a recess for the reception of the handle B, which is fastened by a bolt, *d*, passing through a longitudinal slot, *e*, in the jaw, whereby the leg or handle can be adjusted to suit very low or very high wheels. The upper end of each head or jaw A is formed with a right-angular notch, C. This notch governs the action of the jack by placing the outer portion of it under the axle; then, by bearing down upon the leg or handle used as a lever, the axle passes to the other part of the notch, which, being at right angles with the perpendicular of bearing, causes the lever to rest steadily, and secures the axle in the desired position. One of the legs or levers B is shorter than the other—the short one for low or front wheels, and the long one for high or hind wheels, and are used alternately as levers and standards, as may be required to raise low or high wheels.

Having thus fully described our invention, what we claim as new, and desire to secure by Letters Patent, is—

1. Two cast jaws or heads, A A, of similar shape, pivoted to each other, to be used alternately in the same manner, and attached to legs or handles, for the purpose herein described.

2. The jaws or heads A A, provided with right-angular notches C C, and attached to legs or handles of unequal lengths, for the purpose set forth.

3. The combination of the jaws A A, with notches C C, flanges *b b*, and slots *e e*, pivoted together at *a*, and the levers or handles B B, of unequal lengths, adjusted to the jaws by the bolts *d d* passing through the slots *e e*, all substantially as and for the purposes herein set forth.

In testimony that we claim the foregoing we have hereunto set our hands this 10th day of August, 1874.

WILLIAM H. DUNGAN.
DAVID H. HORNER.

Witnesses:
JAMES T. MCKIM,
JOHN W. CHAMBERS.